Patented Aug. 31, 1948

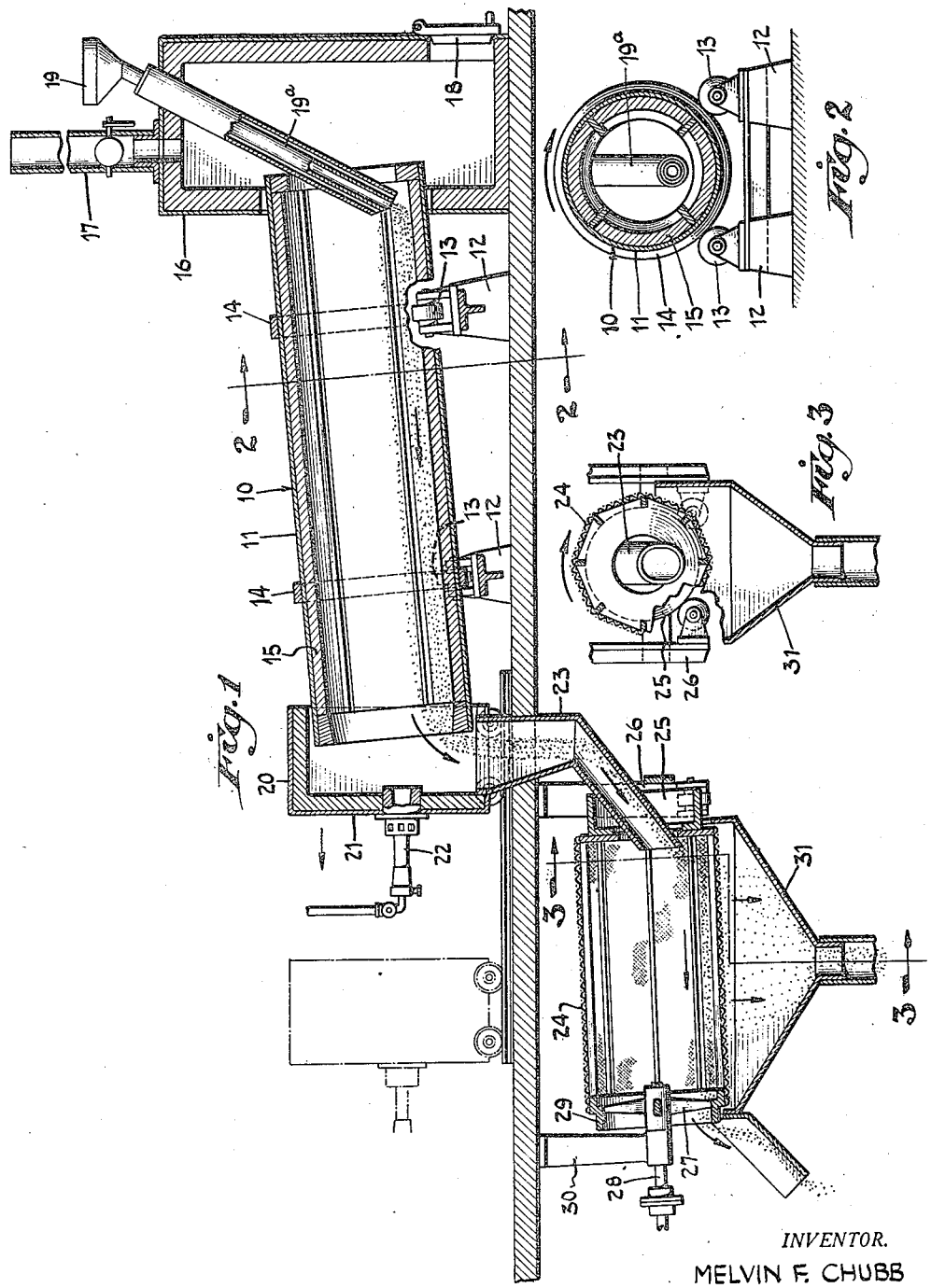

2,448,353

UNITED STATES PATENT OFFICE 2,448,353

PRODUCT AND METHOD OF MAKING FUSED LITHARGE PARTICLES COATED WITH RED LEAD

Melvin F. Chubb, Joplin, Mo., assignor to The Eagle-Picher Company, Cincinnati, Ohio, a corporation of Ohio Application October 4, 1944, Serial No. 557,146

11 Claims. (Cl. 23—146)

This invention relates to a fused litharge, each particle of which has a coating of red lead. This product is particularly useful in the positive plates of storage batteries, and its use in such connection has been disclosed in co-pending application Serial No. 523,934 made by one of the present inventors, Melvin F. Chubb, together with Hershel Briggs. When properly used, it confers the advantages of fast formation which may take place in acid strong enough to be used in the battery itself when the latter is in service. A longer battery life results because the paste does not slough off the plates in service. This effect leads to a much longer bench or cycling life test.

Briefly stated, the invention first comprises the preparation of a fused litharge which may be either of the red or yellow modification. Following the preparation thereof, a coating of red lead, $Pb_3O_4$, is generated on the particles of the litharge by oxidizing the latter in a suitable kiln or furnace at a temperature of about 800° F. to 950° F. with free access of air. From 15% to 50% preferably about 30% by weight of $Pb_3O_4$, is then "burnt-in" during the oxidation step.

The manufacture of fused litharge is per se not new. A complete disclosure of how it is made forms the subject matter of U. S. Patent 592,594, October 26, 1897 to Carl V. Petraeus. It may be mentioned, however, that the yellow modification is made by allowing the fused litharge to cool rapidly as for instance by falling on a concrete or iron floor which is at ordinary temperature. If the stream of molten litharge is allowed to flow into an iron pot, say of five to one hundred or more gallons capacity, it will cool slowly and the reddish modification will be formed.

The red or yellow cooled product is now ground in a micromill of the Bird or the Raymond types, or of the swing hammer or ball mill type, preferably with air separation, or other suitable mill to a particle size ranging from 3 to 6 microns radius. The ground product is now charged into a kiln which may be the one which is illustrated in the figure, but which may also be of the older type employing a round basin and a rabble arm. The kiln is operated, as before stated, at between 800° F. and 950° F. under conditions of free access of air and continuous agitation by rotation. The air blast must not be so strong as to blow particles of the product out of the kiln. When using the latter, production is continuous, the speed of rotation of the kiln being adjusted to the speed with which the product is formed.

In the drawings,

Figure 1 is a longitudinal sectional view of the apparatus.

Figure 2 is a cross section taken on the line 2—2 of Figure 1.

Figure 3 is a cross section taken on the line 3—3 of Figure 1.

10 is a rotary kiln of the inclined cylinder type. A cylinder 11 is mounted upon piers 12 upon which there are rollers 13 over which large bearing rings 14 revolve. The latter encircle the cylinder. A lining 15 of refractory brick is provided.

At the higher end of cylinder 11 is a breeching 16 closing the otherwise open end of the cylinder and providing a draft through a stack 17. A door 18 is provided as a clean-out near the bottom of the breeching. The kiln is fed through a hopper 19 and a flow tube 19a, which consists preferably of a delivery or inner tube and an outer or protective tube so that blows will not construct the feed channel.

At the opposite lower end of cylinder 11 there is a removable breeching 20 through the vertical wall 21 of which there projects a gas or oil burner 22. As shown in dotted line, it may be rolled back on wheels, leaving the delivery spout 23 which ordinarily projects downward from it through the floor in place.

Below the floor level there is a rotary, preferably polygonal screen drum 24, somewhat inclined in the same direction as the kiln. By reason of such inclination, a continuous gravity-induced travel of the material to be heated occurs throughout the entire apparatus. Drum 24 is supported on the high end by a hub 25 and a hanger 26 supporting the hub and affording a bearing surface for its rotation. The low end is supported by a spider 27, the hub of which is tight to a drive shaft 28 and the outer ends of which are encircled by a rim 29 to which the drum is fast. A hanger 30 supports the drive shaft. Spanning the lower part of the drum is a hopper housing 31 to catch the fine material passing the sieves.

The apparatus is operated like any standard rotary kiln. Spout 23 functions as a cooler for the hot oxides on the way down to the screen drum. For this reason it may be made with cooling fins or it may be waterjacketed.

While it is preferred to operate the kiln at 800° F. at the inlet end and 950° F. at the exit end, the temperature at that end may approach 1000° F. provided that under no conditions is this exceeded. It is an absolutely critical point. It is impossible to state precisely how many revolutions per minute the kiln should make, since time of retention is the controlling factor. In general, the heating at the temperature range specified should last for a period between 30 minutes and 6 hours. The longer times are necessary when the older type of rabbled batch furnace, previously mentioned, is employed. The flame employed in kiln operation should be short and supplied with sufficient oxygen for complete combustion. It should not touch the material to be oxidized.

The process up to this point is identical for two variations of the product that are commercially valuable. The first of these products is screened but not milled after it leaves the kiln cylinder 11. It is called A for convenience. The second product is not customarily screened but is dry-milled in an impact pulverizer or similar mill in order to crack the particles. It is called B.

Product A is intended for use in a battery paste prepared according to the co-pending application of M. F. Chubb, Serial No. 551,000. In the application referred to, product A is mixed with basic or normal lead sulfate, the mixture moistened and packed into storage battery grids where it then hardens. In order that a reasonable time interval may elapse between the moistening and the hardening, product A is made to be slow acting. Consequently, very small sized particles are not desired since the smaller the particle the faster the reaction. Exposure of the litharge also apparently hastens the reaction, so no effort is made to crack the particles or otherwise expose the litharge such as is the case in making product B. Product A should range from 3 to 6 microns median radius.

Product B is, as previously mentioned, prepared usually without screening, but with thorough milling in an impact or other pulverizer to a median radius of particle of 1.5 to 4 microns. Substantially each particle is split so as to expose a surface both of litharge and red lead. For this reason, the reaction rate, with normal sulfuric acid, is rapid. It is intended for use in making the paste used in the positive plates of storage batteries, particularly as disclosed in copending application Serial No. 523,934 of Chubb and Briggs mentioned in the introduction to this specification. For some reason, not yet understood, the plate made with a paste formed from this material can be over-formed or given excess charging current on the initial conversion to lead peroxide over and above that required to convert the materials to lead peroxide without damage to the plate.

The invention described herein is referred to in my copending applications Serial Nos. 523,933, 540,668 and 563,274, and in the copending applications of myself and Briggs, Serial No. 523,934 and of myself and Hense, Serial No. 551,000.

I claim as my invention:

1. A lead oxide product useful for making a paste for storage battery plates which comprises split particles, which consisted, before splitting, of a core of fused litharge coated with $Pb_3O_4$, said $Pb_3O_4$ weighing from 15% to 50% of the entire mass, said split particles ranging in median radius from approximately 1.5 to 4 microns.

2. A battery oxide consisting essentially of particles ranging in median radius from approximately 3 to 6 microns, said particles having a core of fused litharge and said particles having a coating of $Pb_3O_4$.

3. A lead oxide product useful for making a paste for storage battery plates which comprises split particles, which consisted, before splitting, of a core of fused litharge coated with $Pb_3O_4$, said split particles ranging in median radius from approximately 1.5 to 4 microns.

4. A product according to claim 1 in which the core is red litharge.

5. A product according to claim 1 in which the core is yellow litharge.

6. The process of making a lead oxide product suitable for use in making paste for storage battery plates, which comprises oxidizing lead to litharge above the fusion point but below the volatilization point of the litharge, cooling and milling said litharge, preheating it with free access of air to a temperature ranging from about 800° F. to 1000° F. until it acquires a coating of $Pb_3O_4$ weighing between 15% and 50% of the entire mass, then milling the product so obtained to split the particles thereof and to produce particles having a median radius ranging from 1.5 to 4 microns.

7. A process according to claim 6 in which the cooling is sufficiently rapid to form yellow litharge.

8. A process according to claim 6 in which the cooling is sufficiently slow to form red litharge.

9. The process of making a product useful in storage battery positive plates which comprises fusing litharge, grinding the fused, cooled product to a fineness between 3 and 6 microns median radius, then heating the ground product to about 800° F. to 1000° F. with free access of air for a time ranging from 30 minutes to 6 hours, cooling and screening the product to a fineness of 3.0 to 6 microns.

10. A process according to claim 9 in which the litharge is the yellow modification.

11. A process according to claim 9 in which the litharge is the red modification.

MELVIN F. CHUBB.

REFERENCES CITED

The following references are of record in the file of this patent:

UNITED STATES PATENTS

| Number | Name | Date |
|---|---|---|
| 592,594 | Petraeus | Oct. 26, 1897 |
| 637,028 | Petraeus | Nov. 4, 1899 |
| 1,491,237 | Hufford et al. | Apr. 22, 1924 |
| 1,992,395 | Rose et al. | Feb. 26, 1935 |
| 2,182,436 | Johnstone | Dec. 5, 1939 |
| 2,235,487 | Mayer | Mar. 18, 1941 |

OTHER REFERENCES

Mattrello, Protective and Decorative Coatings, vol. II, pp. 358, 359 and 361 (1942), John Wiley & Sons, N. Y.

Transactions Aime, vol. 128, pages 37-41, 56.

Mellor, Comprehensive Treatise on Inorganic and Theoretical Chemistry, 1927, vol. 7, page 644, Sec. 13.